G. W. JOHNSON.
FRUIT SEPARATOR.
APPLICATION FILED JULY 11, 1913.

1,118,779.

Patented Nov. 24, 1914.

WITNESSES
L. H. Schmidt.
Myron G. Clear.

INVENTOR
GEORGE W. JOHNSON,
BY Munn & Co
ATTORNEYS

UNITED STATES PATENT OFFICE.

GEORGE WILLIAM JOHNSON, OF POMONA, CALIFORNIA.

FRUIT-SEPARATOR.

1,118,779.  Specification of Letters Patent.  Patented Nov. 24, 1914.

Application filed July 11, 1913. Serial No. 778,540.

*To all whom it may concern:*

Be it known that I, GEORGE W. JOHNSON, a citizen of the United States, and a resident of Pomona, in the county of Los Angeles and State of California, have made a new and useful Improvement in Fruit-Separators, of which the following is a specification.

My present invention relates to fruit separators and more particularly to apparatus for separating frozen fruit from good fruit, such as for instance oranges and lemons, and the object of my invention is to provide simple and inexpensive means whereby to accomplish the desired result without the necessity of a running stream or current of water.

It is well known that, due to the difference in specific gravity between frozen and good fruit, the good fruit will sink considerably deeper if thrust in water, than will the frozen fruit and I propose to take advantage of this fact by the provision of a water receptacle with means whereby to effectively introduce the fruit therein and other means whereby to deflect and guide the lower sinking good fruit into a different portion of the water receptacle than that in which the frozen fruit are retained.

Figure 1:
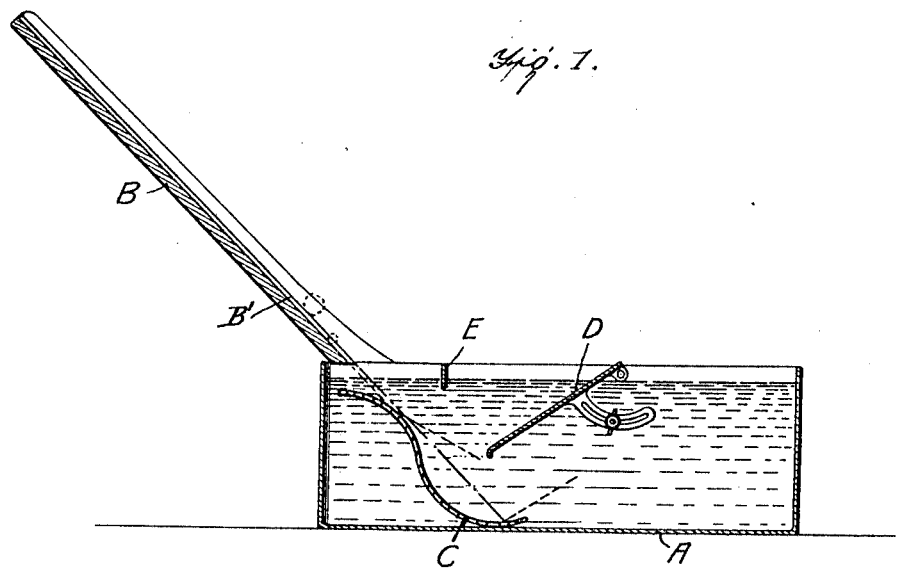
Figure 2:
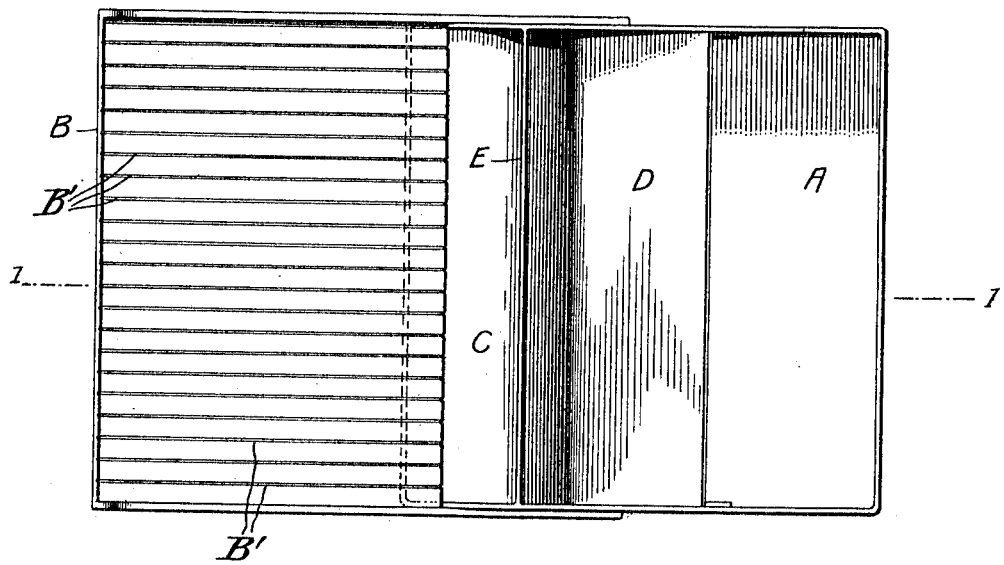

In the accompanying drawing, which illustrates my invention, Figure 1 is a central vertical longitudinal section taken through my improved apparatus, and, Fig. 2 is a plan view thereof.

Referring now to these figures, I provide a substantially rectangular tank A, which is adapted to contain water, and to one end of which is secured an inclined plane or conveyer B, the lower end of which extends to the tank.

The plane or conveyer B is preferably provided with grooves B' in order that the fruit placed thereon will be guided in straight lines into the tank and given an effective rotation or spinning motion for the purpose of carrying the good fruit low in the water.

Across the rear portion of the tank is extended a deflecting plate or member C, in respect to which the plane or conveyer B is substantially tangential so that the good fruit discharged from the lower end of the latter will be deflected forwardly in the tank A, still spinning, below the lower rear edge of an inclined baffle plate D extended across the tank forwardly of plate C and adjustably mounted therein.

It will be noted that the upper portion of this deflecting plate C is curved in one direction to present a convex face to the fruit descending in the water, while its lower portion is curved in a relatively opposite direction in order to present a concave face. The curves of these portions of the plate merge at an intermediate point, as will be particularly seen, and the plate as a whole thus presents a gradually changing curvature adapting the same to properly deflect large and small fruit delivered into the water at different points longitudinally of the tank A. I am aware that a grooved conveyer has been used for the purpose of delivering fruit into a separating tank of the present character, the grooves being essential for the purpose of giving the fruit a decided rotary movement as it is projected into the water, and also for the purpose of turning all of the fruit so that the axis of each is transverse with respect to the conveyer plate itself, and it is well known that this structure including the grooves results in a decided disadvantage in that the grooves in practice hold the large oranges farther away from the plate than the smaller ones, and thus deliver them at different points longitudinally of the tank. By the use of the deflector plate curved as I have described, large and small oranges delivered at different points are nevertheless deflected beneath the lower edge of the properly adjusted baffle plate D.

The function of baffle plate D will thus be seen to separate the tank into two compartments, one forwardly of, and below the said plate for the good fruit, and the other rearwardly of, and above, the said plate and between the same and a transverse guard strip E extended across the tank at the surface of the water and a short distance forwardly of the lower end of the conveyer B, the frozen fruit being, in this manner, prevented from floating rearwardly in the path of fruit subsequently discharged from the conveyer. It will thus be seen that my apparatus is well adapted to effectively separate the frozen from the good fruit, without the necessity of running water, and that the means which I employ are both simple and inexpensive.

I claim:

A separator of the character described, including a tank forming a water receptacle, a baffle member intermediate the ends of the tank and beneath which the good fruit are projected, a conveyer at one end of the tank constructed and arranged to deliver the fruit at different points longitudinally of the tank, and a deflector plate beneath the conveyer, the upper portion of this deflector plate being curved in one direction to present a convex face to the fruit from the conveyer and the lower portion thereof being curved in a relatively opposite direction to present a concave face to the descending fruit, said upper and lower portions of said plate having their curves merging to form a gradually changing curvature and the plate being thus adapted to deflect beneath the baffle member fruit delivered from the conveyer at different points longitudinally of the tank.

GEORGE WILLIAM JOHNSON.

Witnesses:
 THOMAS HARRISON,
 S. C. HENDERSON.